Nov. 25, 1924.

F. H. OWENS 1,516,496

MOTION PICTURE APPARATUS AND CAMERA

Filed April 29, 1921   3 Sheets-Sheet 1

INVENTOR
Freeman H. Owens.
BY
James A. G. Koehl
ATTORNEY

Nov. 25, 1924.
F. H. OWENS
1,516,496
MOTION PICTURE APPARATUS AND CAMERA
Filed April 29, 1921    3 Sheets-Sheet 2
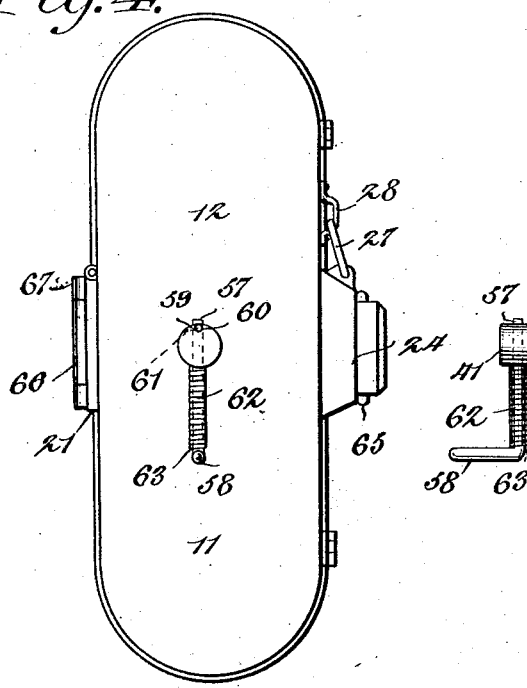
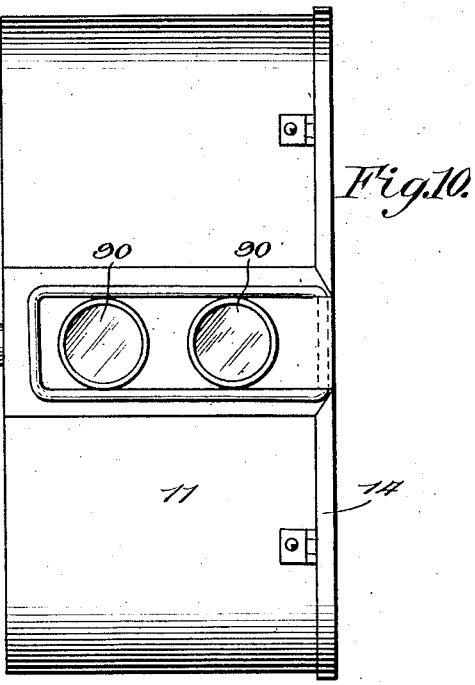
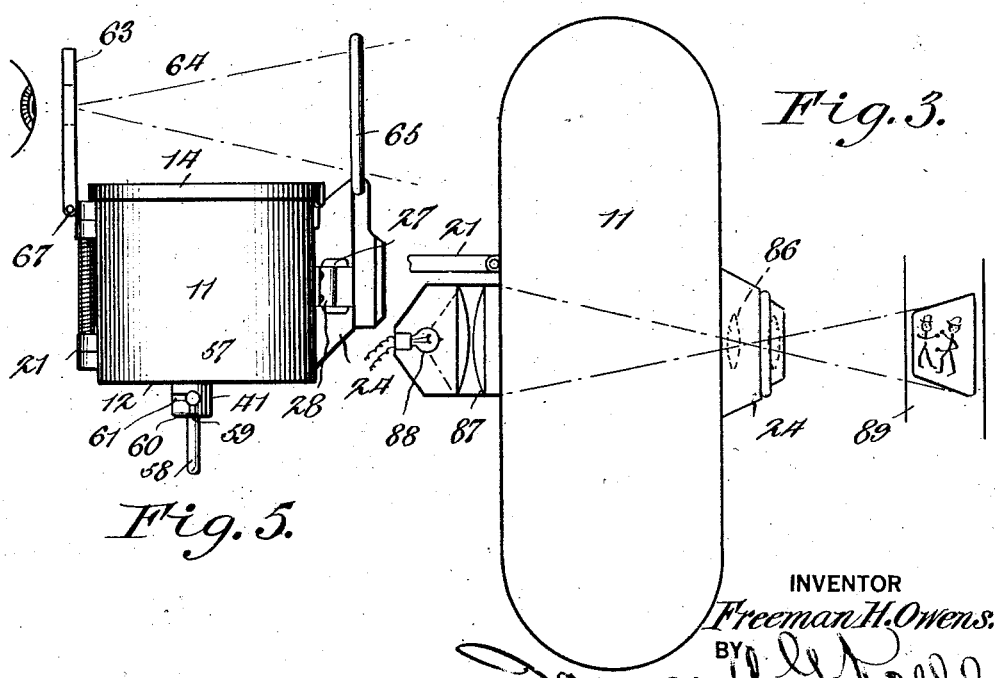
INVENTOR
Freeman H. Owens.
BY
ATTORNEY Nov. 25, 1924.  
F. H. OWENS  
1,516,496  
MOTION PICTURE APPARATUS AND CAMERA  
Filed April 29, 1921   3 Sheets-Sheet 3

INVENTOR  
Freeman H. Owens.  
BY  
ATTORNEY

Patented Nov. 25, 1924.

1,516,496

UNITED STATES PATENT OFFICE.

FREEMAN H. OWENS, OF NEW YORK, N. Y.

MOTION-PICTURE APPARATUS AND CAMERA.

Application filed April 29, 1921. Serial No. 465,405.

*To all whom it may concern:*

Be it known that I, FREEMAN H. OWENS, a citizen of the United States, residing at New York city, in the county of New York and State of New York, have invented a new and useful Improvement in Motion-Picture Apparatus and Cameras, of which the following is a specification.

This invention relates to a combined cinematograph camera and projector mechanism or means for effecting cinematographic displays and has for its primary object the provision of a structure of this character which will embody instrumentalities whereby the structure can be quickly converted from a cinematograph camera to a projecting mechanism or vice versa and the structure used effectively for either of these purposes.

Another object of the invention is to provide a structure of this character which will embody a shutter which is common to the camera mechanism and projector mechanism, the same being of a design whereby it will operate as a dissolving means at the time of the picture change and which will be adjustable to vary the duration of exposure when the structure is used as a cinematograph camera.

A further object of the invention is to provide a structure of this character wherein use of a shutter is made, the same serving in the three fold capacity, (1 means for dissolving the light at the picture change, 2) means for varying the duration of exposure by regulating the size of the shutter opening when the same is used as a cinematograph camera, and 3) means for operatively moving a perforated film or tape across the lens or exposure aperture.

Another object of the invention is to provide a structure of this character including a casing having magazines constructed and designed to automatically adapt themselves to the coiled tendency of the film ends and which will serve to permit the film to be drawn from one of such magazines to the other and utilize the inherent resiliency of the film or tape to coil itself automatically as the tape is moved across the projector or exposure aperture.

Another object of the invention is to provide a mechanism of this character in which use is made of a shutter and means controlled directly by the action of the shutter to lock the film or tape against movement with respect to the aperture during the taking of pictures or at the time of projection thereof, these two instrumentalities of the mechanism co-acting to release the film and to permit the same to be successively or intermittently drawn across the aperture.

A still further object of the invention is to provide a mechanism of this character which will employ a novel form of film pack adapted to be conveniently placed in one of the magazines of the device and the unexposed film unloaded conveniently and associated with the shutter and sprocket mechanism so that it can be drawn across the exposure aperture.

A still further object of the invention is to provide a structure of this character which will be extremely compact, neat in design and appearance and capable of being reduced to a size whereby the same can be readily carried upon the person or in the pocket; one which will be inexpensive of manufacture, and highly effective both as a cinematograph camera and as a picture projector.

With the above and other objects in view which will appear as the nature of the invention is better understood, the same consists in the improved construction and novel arrangements of parts which will hereinafter be fully described and pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 3 is a diagram in side elevation showing the structure adjusted for use as a projector.

Figure 4 is a side elevation on a smaller scale of the structure.

Figure 5 is a top plan view showing the finder.

Figure 10 is a front elevation of the apparatus showing a slightly modified form of the invention.

Figure 2:
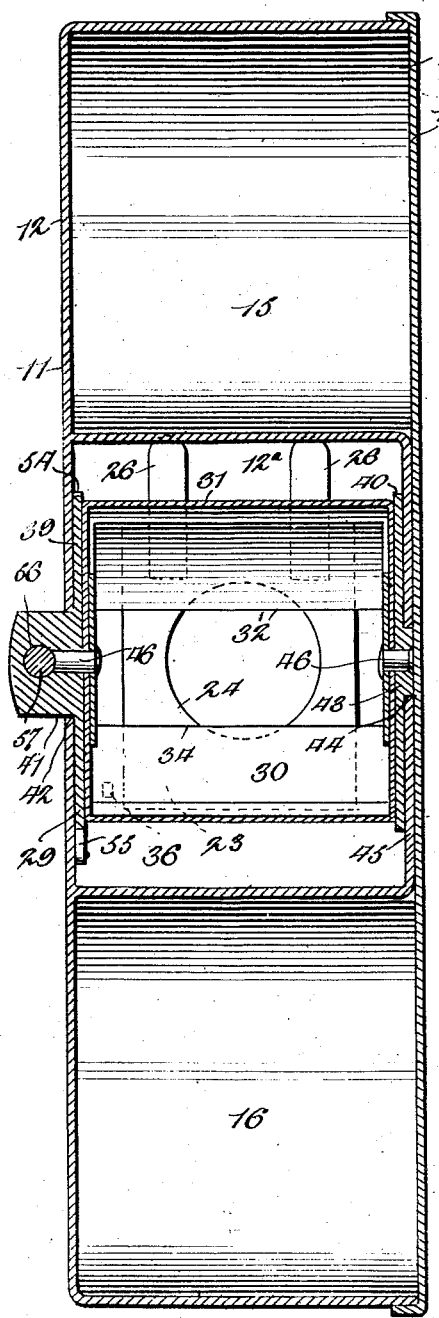
Figure 2 is a section therethrough taken on line 2—2 of Figure 1.

In carrying the invention into practice, use is made of a casing or receptacle 11 which is closed at one side as at 12 and open at its other side as at 13 and provided with a hinged closure 14 for covering said open side. In the receptacle are film magazines 15 and 16, and an intermediate chamber 17. The magazines 15 and 16 are closed at one side by the wall 12 of the casing and at the opposite side by the hinged closure 14. This construction provides means whereby access can be quickly gained to either of said magazines for the purpose of applying the film or tape or removing the same. Each of said magazines 15 and 16 is of substantially circular formation and as illustrated I do not employ any fixed axes or spindles for supporting a film or tape in said magazines. I am relying solely upon the circular formation of these magazines and inherent resiliency of the film or tape for operatively uncoiling the same from one magazine and coiling the same in the other magazine. In speaking of the resiliency of a film or tape, it is of course understood that I intend using celluloid or a similar or suitable well known composition of matter for the production of a film which will be suitable for this purpose. In a comparatively small length of celluloid film, there is a tendency toward the same compactly coiling into a small roll and it is this common functioning of the film which I desire to utilize in connection with a structure of the type shown in my accompanying drawings. This, however, does not mean that I cannot employ this principle in machines adapted to accommodate films of maximum length. I am positive from actual practice that in reasonably short lengths, say twenty to thirty or forty feet, there is that inherent tendency of the windings of the tape to become closely associated in tight coil formation. There is less draw and wear and tear upon a film when the ends are not supported upon revolving or permanently locked spindles or axes and this is one of the features of my invention with which I am particularly concerned as will be appreciated upon reference to the appended claims in this application.

Figure 1:
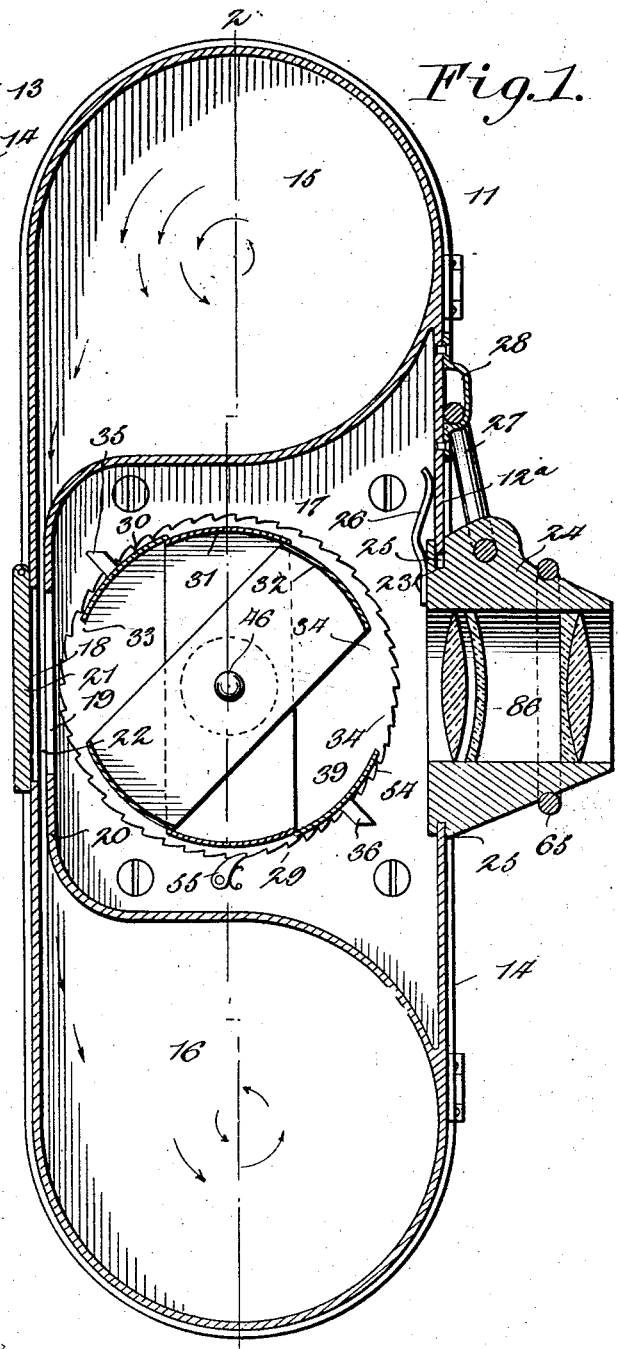
Figure 1 is a vertical section through the structure showing the same adjusted as a cinematograph camera.
Figure 7:
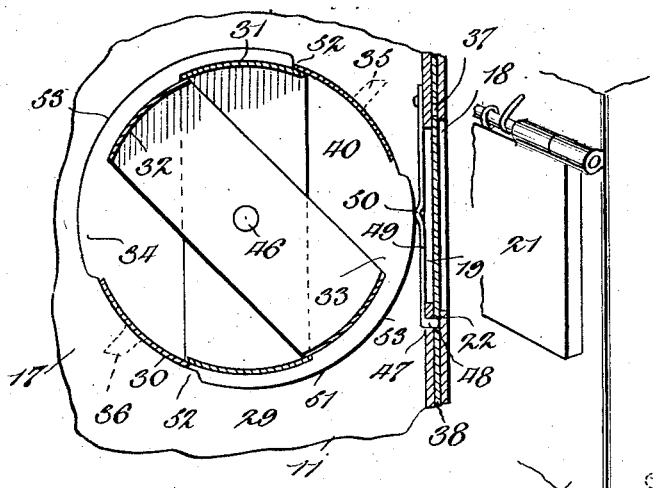
Figure 7 is a vertical section through the shutter showing the film locking means.
Figure 6:
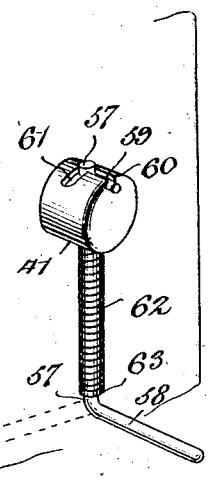
Figure 6 is a perspective view of a portion of the structure showing the operating handle.
Figure 9:
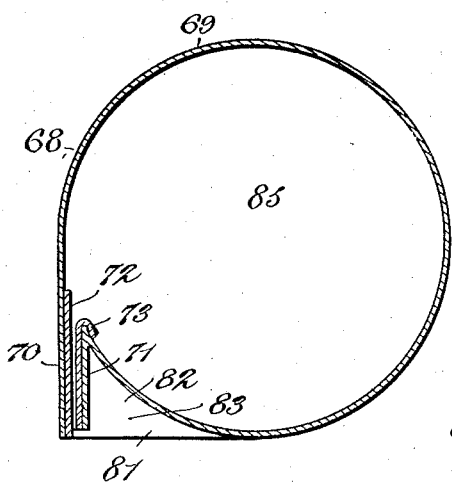
Figure 9 is a similar view with the pack unloaded.

The wall 12 is provided with an aperture 18, the same positioned in line with a similar aperture 19 in the wall 20 of the chamber 17. These apertures may be covered against outside light by means of a suitable closure 21. A further purpose of this closure 21 will appear as the nature of the invention is better understood. It can be said at this point, however, that when the closure is adjusted as shown in Figure 1, the structure can be used as a cinematograph camera.

The distance between the aperture 18 to the aperture 19 is such that a film space 22 is formed between these apertures so that a film in the magazine 15 can be drawn downward and coiled as aforesaid in said magazine 16.

In horizontal alignment with the apertures 18 and 19 and formed in the front wall 12ª of the casing 11 is a rectangular aperture 23 adapted to receive a lens carrier 24. This carrier is grooved at 25 so as to engage with the upper and lower edge walls of the aperture 24 as shown in Figure 1, sufficient play being allowed between the parts so as to permit the carrier to be curved upward and withdrawn from said aperture. It is operatively retained in the aperture by a plurality of leaf springs 26 which are in yielding engagement with the inner face of the wall 12ª when the carrier is applied. A link 27 on the carrier is slidable in a bail 28 on said wall 12ª, the construction also constituting a hinge so that when the carrier is moved upward in said aperture 23 and then released from the walls thereof, it can be swung with the bail 28 and link 27 as a pivot.

Mounted to revolve in the chamber 17 is a combined shutter and sprocket mechanism 29, the same consisting of telescopic sections 30, 31 and 32, conjointly presenting a substantially barrel-like formation. The telescopic arrangement of these sections is such that they can be adjusted to produce diametrically opposite openings 33 and 34, and these openings can be used so as to vary the duration of exposure when the structure is used as a cinematograph camera. When used as a projector, the shutter operates to obliterate the lens at the picture change and to dissolve the light effectively. The section 30 is provided at diametrically opposite points with sprocket teeth 35 and 36 adapted to engage in the marginal openings 37 in the film 38. This shutter is provided with side disks 39 and 40, the former having a trunnion 41 journaled in a bearing aperture 42 in the wall 12 and the latter having a trunnion 43 journaled in an aperture 44 in the wall 45 of the chamber 17. The sections 31 and 32 of the shutter are pivoted to the disks 39 and 40 by pins 46. The shutter sections are held in relatively tight frictional contact so that when an adjustment of the shutter is made, the same can be retained by the action of friction. The section 30 of the shutter is preferably fixed to the said disks 39 and 40.

The wall 20 of the chamber 17 is provided with a perforation 47 which receives a locking pin 48 on a spring arm 49. The pin 47 normally projects into the space 22 between the apertures 18 and 19 and the same is adapted to engage with the sprocket hole in the film. The spring arm is provided with a projection 50 which co-acts with the cam-like periphery 51 of the disk 40, said cam-like periphery having recesses 52 therein adapted to accommodate the projection 50 and release the pin 48 from the perforations in the film. The positions of the recesses 52 are arranged with regard to the shutter mechanism so that when the sprocket teeth 35 and 36 come into play, the pin 48 will be released from the film. As soon as the sprocket teeth pass the film openings, the parts 53 of said peripheral surface of the disk 40 operate to maintain confinement of the pin 48 with the film. This holds the film operatively framed in the exposure or projection apertures. The other disk 39 is provided with ratchet teeth 54, the same co-acting with a dog 55. This detent arrangement holds the shutter mechanism against retrograde rotation.

The trunnion 41 projects beyond the wall 12 and the same is provided with a passage 56 in which the branch 57 of a crank arm 58 slides. Said branch is provided with a pin 59 which is adjustable respectively into locking branches 60 and 61 in said trunnion. When the crank handle is turned to cause its pin 59 to engage in the recess 60, the crank handle is held in the full line position. When the pin 59 is adjusted into the recess 61, the crank handle assumes the dotted line position. The pin is retained in either of said recesses 60 and 61 by means of a spring 62 which surrounds the branch 57 and arranged between the trunnion 41 and a fixed lug 63 on said branch 57.

The finder 64 comprises a bail 65 mounted to swing upon the lens carrier 24. The bail normally comprises said lens carrier but the same is adapted to be adjusted to the position shown in Figure 5 and to co-act with a sight piece 66 which is hinged at 67 to the closure 21. Any suitable well known finder can be used in connection with the apparatus when employed as a cinematograph camera.

Figure 8:
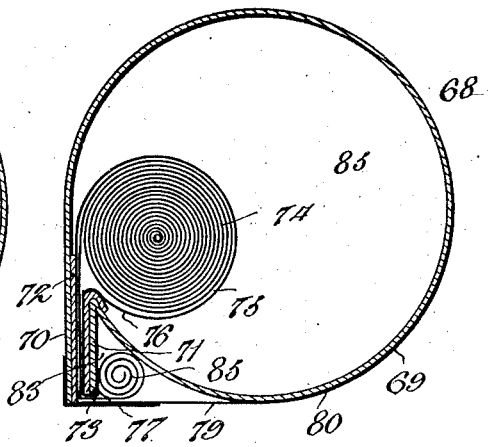
Figure 8 is a vertical section through the film pack showing the same in its normal or loaded condition.

When the apparatus is used as a camera, I preferably employ a film pack 68 which comprises a cylindrical-like receptacle 69, provided with tangential walls 70 and 71. These walls are lined with plush strips 72 and 73 respectively and these constitute a chute through which the film is adapted to pass as it leaves the pack. The film 74 shown in Figure 8 is wound into a tight coil and it is normally held in the loop 75 of a light excluding strip 76. One end of this strip is passed in a downward direction against the plush strip 73 and it is then curved over the wall 71 and pasted or otherwise suitably secured thereto at 77. The opposite terminal 78 of the light excluding strip extends against the plush strip 72 and the same is then turned angularly at 79 and pasted or otherwise secured at 80 to the periphery. This manner of extending the last terminal of the light excluding strip against the receptacle and against the edges 81 of the web walls 82 of said receptacle makes provision for a seal at the discharge end of the pack. The seal is destructible and when destroyed access can be gained to the V-sub-chamber 83 of the pack. The front terminal of the film is sandwiched between the two terminals of the light excluding strip and several windings of the film are normally housed in said sub-chamber 83 as shown at 84 in Figure 8. The light excluding strip may be formed of black paper or any other suitable well known material which can be conveniently destroyed when it is desired to use the film for photographic purposes. After the seal is broken the loop 75 is separated from the windings of the film and said windings have a tendency to expand into the main chamber 85 of the pack structure. The construction of the film pack is such that it conforms with the shape of the magazine 15 and when the cover 14 is opened, said pack can be readily inserted in said magazine. The free end of the film is then guided down between the apertures 18 and 19 and after it is exposed, it is guided into the receiving magazine 16.

The lens carrier 24 is provided with a lens system 86 and when used as a projecting apparatus, it co-operates with a condenser 87 adapted to be arranged at the back of the apertures 18 and 19 when the closure 21 is lifted or adjusted to the position shown in Figure 3. The condenser 87 is combined with a lamp 88 so that a beam of light will be projected through the apertures and through the film.

When the apparatus is used in this manner it may be placed a suitable distance from a screen 89 and the pictures in motion exhibited therefrom.

In Figure 10, I use practically the same mechanism as hereinbefore described but I have slightly rearranged some parts so that a stereoscopic arrangement is produced, there being two sight openings 90—90 arranged side by side and from which the pictures that may be arranged in a similar manner upon the film can be viewed.

If desired, the lens carrier 24 can be detached and by raising the closure 21 so as to permit day light to pass into the apertures 18 and 19, the pictures in motion can be seen by merely looking through the aperture 25.

While I have herein fully shown and described and have pointed out in the appended claims certain novel features of construction, arrangement and operation which characterize my invention, it will be understood by those skilled in the art that various omissions, substitutions and changes in the forms, proportions, sizes and details of the structure, of the materials used, and of their operation, may be made without departing from my invention.

What is claimed as new is:—

1. In an apparatus of the class described, a receptacle having a detachable lens, one wall of the receptacle having an aperture therein, a combined sprocket and shutter operating between the aperture and said lens, and means co-acting with said combined shutter and sprocket for arresting movement of a film across said aperture.

2. In an apparatus of the class described, a receptacle having a frame aperture and a cylindrical shutter operating at one side of said aperture and provided with diametrically disposed openings and means on the shutter for moving a film across said aperture, a toothed surface forming part of said shutter and means co-acting with the surface for holding the shutter against retrograde rotation.

3. In an apparatus of the class described, a receptacle having aligned apertures, a lens structure associated with one of said apertures, a combined sprocket and shutter operating between both apertures, the other aperture operating to permit of the passage thereacross of a film strip, means on the shutter and means disposed with respect to said other aperture and co-acting with the means of said shutter for arresting movement of the film strip with respect to said other aperture.

4. In an apparatus of the class described, a receptacle having a lens, one wall of the receptacle having an aperture therein, a combined sprocket and shutter operating between the aperture and said lens, and means co-acting with said combined shutter and sprocket for arresting movement of a film across said aperture.

In testimony whereof, I have signed my name to this specification, this 28th day of April, 1921.

FREEMAN H. OWENS.